United States Patent
Contractor

(10) Patent No.: US 6,674,840 B1
(45) Date of Patent: Jan. 6, 2004

(54) SYSTEMS AND METHODS FOR VERIFYING THE PROVISIONING OF ADVANCED INTELLIGENT NETWORK SERVICES

(75) Inventor: Sunil H. Contractor, Marietta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 83 days.

(21) Appl. No.: 09/749,867

(22) Filed: Dec. 28, 2000

(51) Int. Cl.$^7$ .............................. H04M 1/24; H04M 3/08
(52) U.S. Cl. ................ 379/15.03; 379/15.02; 379/201.12
(58) Field of Search .................... 379/15.01, 15.02, 379/15.03, 15.04, 211.02, 1.01, 29.02, 29.01, 27.01, 27.02, 26.01, 26.02, 10.01, 201.12

(56) References Cited

U.S. PATENT DOCUMENTS

| | | | | |
|---|---|---|---|---|
| 4,930,151 A | * | 5/1990 | Walton et al. ............... | 379/211 |
| 5,065,422 A | * | 11/1991 | Ishikawa ..................... | 379/11 |
| 5,359,646 A | * | 10/1994 | Johnson et al. ............ | 379/27 |
| 5,592,541 A | * | 1/1997 | Fleischer, III et al. ...... | 379/211 |
| 5,701,301 A | | 12/1997 | Weisser, Jr. ................. | 370/428 |
| 5,729,599 A | * | 3/1998 | Plomondon et al. ........ | 379/211 |
| 5,740,237 A | * | 4/1998 | Malik et al. ................ | 379/211 |
| 5,818,919 A | * | 10/1998 | Berberich et al. .......... | 379/211 |
| 6,016,334 A | * | 1/2000 | Kasrai ......................... | 379/15 |
| 6,160,794 A | * | 12/2000 | Malik et al. ................ | 379/142 |

* cited by examiner

*Primary Examiner*—Rexford Barnie
(74) *Attorney, Agent, or Firm*—Woodcock Washburn LLP

(57) ABSTRACT

Methods and systems are disclosed for automatically verifying the correct provisioning of recent subscribers to provisioned services and identifying subscribers for whom services were not correctly provisioned. The automatic verification and identification system comprises a service switching point, a service control point and an automatic provisioning verification testing device. The testing device is adapted to place a call to the subscriber's telephone directory number through the service switching point. The service switching point is adapted to suspend calls directed to a service control point and to send information concerning calling and called parties to the service control point. The service control point is adapted to querying a database of subscription information and replacing the calling party information with information to be verified. The service control point then directs the service switching point to call the incoming telephone line of the testing device. The testing device compares information received from the service switching point with information contained in a subscription database associated with the testing device. Information that is not substantially identical is identified as requiring further investigation. Calls to directory numbers made on the outgoing line of the testing device for which no corresponding call is received on the incoming line are identified as requiring further investigation.

11 Claims, 3 Drawing Sheets

SYSTEMS AND METHODS FOR VERIFYING THE PROVISIONING OF ADVANCED INTELLIGENT NETWORK SERVICES

FIELD OF THE INVENTION

The present invention relates to the field of telecommunications. More particularly, the present invention relates to automated systems and methods of verifying that customer services have been properly provisioned in an Advanced Intelligent Network (AIN) telephone system.

BACKGROUND OF THE INVENTION

When a telephone customer signs up for a new Advanced Intelligent Network (AIN) service, a multitude of systems must be set and file updates must be made on a number of elements in the Advanced Intelligent Network (AIN) system. This process, called provisioning, must occur at the central office or CO, (also called the service switching point or SSP), at the signaling transfer point (STP) and at those network elements where the subscriptions data is stored. Some of these network elements are automated so that the provisioning process can be done through software. In other cases, provisioning must take place manually. Because there are so many devices and human factors involved the provisioning process is error prone. The error rate can be as high as 15 to 20% in the provisioning of a new service. Unfortunately, it is often a customer who detects the error in the provisioning, which may result in diminished customer satisfaction and distrust of the customer's telephone company.

It would be preferable to reduce the number of errors in provisioning and to decrease the number of times that a customer, rather than a telephone company, finds the errors. Hence a need exists in the art for an automated system for verifying provisioning of AIN services has taken place correctly, and conversely to identify when provisioning has not taken place correctly.

SUMMARY OF THE INVENTION

In the disclosed invention, systems and methods are directed to validating that an advanced intelligent network (AIN) service has been properly provisioned. The systems and methods provide that an automated test telephone call is placed to invoke a customer-ordered AIN service. The AIN network elements that have been provisioned to provide the service recognize, based on the calling number, that the call is for testing purposes, and forward the call to a test-designated telephone line. A calling party number field containing service specific data may also be forwarded to the test line. If the appropriate response is received at the test-designated telephone line within a specified time period, the service has been properly provisioned. If no call is received at the designated testing telephone line, it can be concluded that the service has not been properly provisioned and requires further investigation.

BRIEF DESCRIPTION OF THE DRAWINGS

The foregoing summary, as well as the following detailed description of preferred embodiments of the present invention, will be better understood when read in conjunction with the appended drawings. For the purpose of illustrating the invention, there are shown in the drawings embodiments that are presently preferred. As should be understood, however, the invention is not limited to the precise arrangements and instrumentalities shown. In the drawings.

Figure 1:
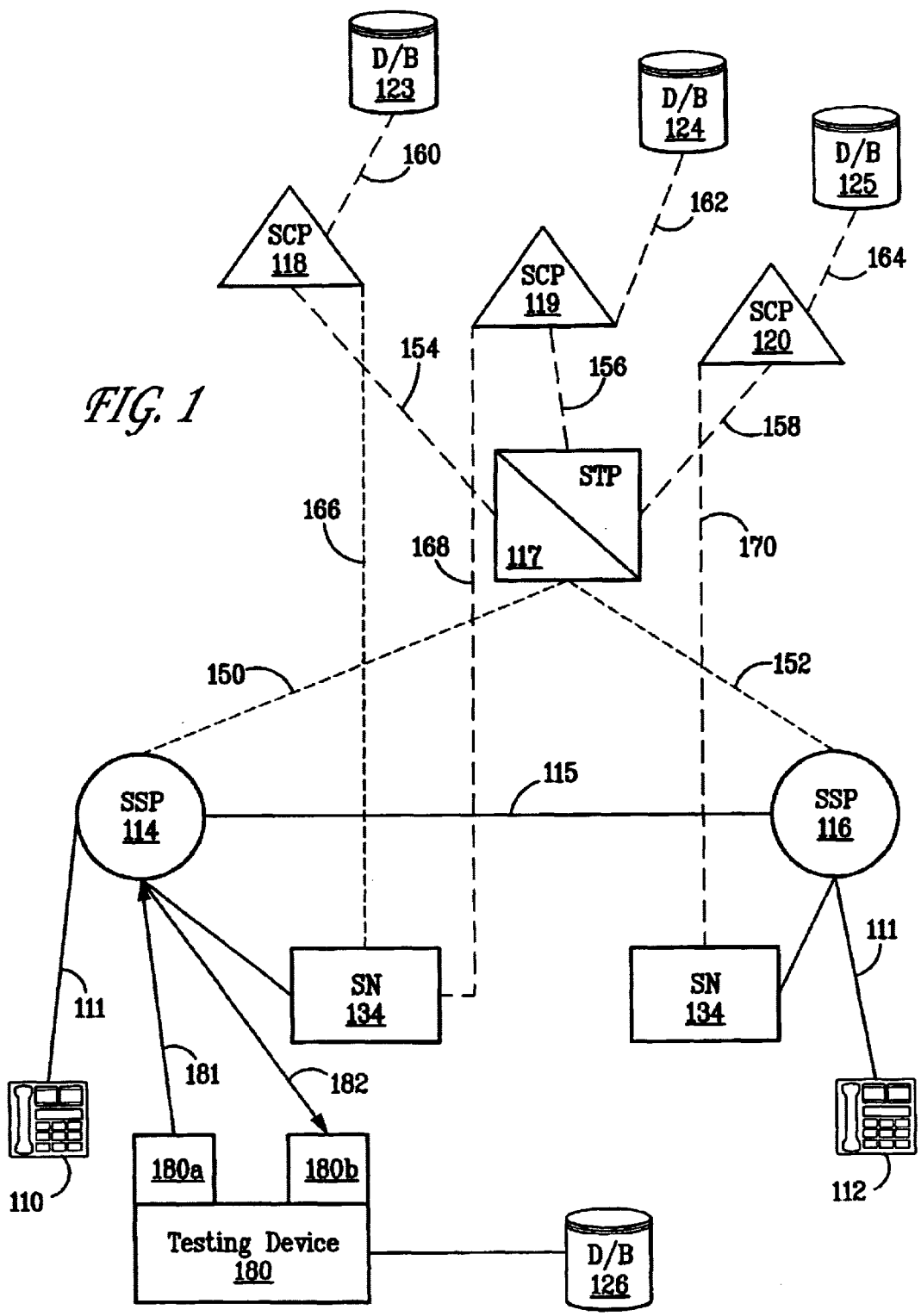
FIG. 1 illustrates, in a general block diagram form, an Advanced Intelligent Network (AIN) based system for implementing Intelligent Network management features, such as that which may be employed in connection with the present invention.

The present invention is further described in the detailed description that follows, by reference to the noted plurality of drawings by way of non-limiting examples of preferred embodiments of the present invention, in which like reference numerals represent similar parts throughout the several views of the drawings.

DETAILED DESCRIPTION OF THE PREFERRED EMBODIMENTS

Overview of an Exemplary Telephone Network

Referring now to the figures, a preferred embodiment of the systems and methods of the present invention will be described. Basic telephony concepts and terminology are used throughout the description as would be understood by one of skill in the art.

Referring now to FIG. 1, there is shown an exemplary telecommunication network. This exemplary environment is the public switched telecommunications network (PSTN). A portion of the PSTN is illustrated in FIG. 1 and is generally described below.

According to an aspect of the present invention, systems and methods for an automated provisioning verification or checking system may be implemented for an AIN or AIN-type network using a computer telephony system. AIN systems are described in U.S. Pat. No. 5,701,301, which is incorporated herein by reference in its entirety. In particular, an AIN network with advanced intelligent network capabilities may be utilized to implement the various features and aspects of the invention. It should be noted, however, that the implementation of the present invention is not limited to AIN-based networks and other advanced or intelligent networks and arrangements may be used to implement the invention.

Referring now to the accompanying drawings, FIG. 1 illustrates a simplified AIN-based network arrangement incorporating the various features of the invention, as further described below. The AIN includes a variety of interconnected network elements. A group of such network elements includes a plurality of central offices (COs) 114, 116 capable of generating AIN queries, also called service switching points (SSPs). A central office or SSP is a switch and the terms are used interchangeably herein. SSPs 114 and 116 may comprise, for example, DMS100 or 5ESS switches. These switches may be manufactured by, for example, Lucent Technologies, Inc. or Nortel Networks.

As further illustrated in FIG. 1, SSPs 114, 116 have a plurality of subscriber lines 111 connected thereto. Subscriber lines 111 may also be referred to as calling lines. Each SSP 114, 116 serves a designated group of calling lines, and thus, the SSP or switch that serves a particular calling line may be referred to as its serving switch. Each calling line 111 typically is connected to a piece of terminating equipment including a plurality of telephones designated, e.g., as 110, 112. Although telephones are illustrated as the pieces of terminating equipment in FIG. 1, those skilled in the art will understand that such pieces include other telecommunication devices such as facsimile machines, computers, modems, etc.

Pursuant to the preferred embodiment, each active calling line is assigned a ten-digit calling line number. In the description of the present invention, the term "calling line number" is used in its generally understood meaning to be the number of a telephone or the like from which a call is made. A number which is dialed or input by a caller or source to reach a piece of terminating equipment is called the "called line number". Calling and called line numbers are commonly referred to as telephone numbers or directory numbers.

Referring again to FIG. 1, SSPs 114, 116 are interconnected by a plurality of trunk circuits 115. These are the voice path trunks that interconnect SSPs 114, 116 to connect communications. The term "communication" or "call" is used herein to include all messages that may be exchanged between caller and called party in the network illustrated in FIG. 1. Trunk 115 may be either a Signaling System 7 (SS7) controlled multi-frequency trunk (MF), or primary rate interface (PRI) trunk or the like. The type of trunk will be in accordance with both the sending and receiving SSP to which it is connected.

In the example shown in FIG. 1, each SSP 114, 116 may include different types of facilities and/or triggers. SSPs 114 and 116 are each programmable switches which may perform the following functions: recognize AIN-type calls, launch queries, and receive commands and data to further process and route AIN-type calls. When one of SSPs 114 or 116 is triggered by an AIN-type call, the triggered SSP 114 or 116 formulates and sends an AIN query. Based on the reply from the AIN network, SSP 114 or 116 responds to call processing instructions received. According to an aspect of the invention, the AIN service logic may reside at SCP 118, 119 or 120.

Each of SSPs 114 and 116 is connected to a signal transfer point (STP) 117 via respective data links 150, 152. In one embodiment, these are data links employing a signaling protocol referred to as SS7, which is well known to those skilled in the art, however, it should be understood that any suitable signaling protocol may be employed without departing from the spirit and scope of the invention. In order to facilitate signaling and data messaging, each SSP 114 and 116 may be equipped with Common Channel Signaling (CCS) capabilities, e.g., SS7, which provides two-way communications of data messages over CCS links 150 and 152 between components of the AIN network. The data messages may be formatted in accordance with the Transaction Capabilities Applications Part (TCAP). Alternatively, Integrated Service Digital Network (ISDN) Users Part (ISUP) may be used for signaling purposes between, for example, SSPs 114 and 116. In such a case, SSPs 114 and 116 may be equipped with the capability to map appropriate data between TCAP and ISUP protocols, and vice versa. The telephone network essentially employs an upper-level software controlled network through the STPs and the SCP.

Accordingly, the connections by links 150, 152, 154, 156, and 158 are for signaling purposes and allow SSPs 114 and 116 to send messages to and to receive messages from SCP 118, 119 and 120. For purposes of illustration, various features of the present invention will now be described from the standpoint of a switch implementing AIN protocols, provisioned with TAT (termination attempt trigger) or PODP (public office dialing plan) triggers. One skilled in the art will further recognize that the above-described network is a simplified network meant for explanatory purposes. It is likely that a telephone network may comprise numerous user stations, SSPs, STPs, SCPs, and SNs along with other telephone network elements and may employ other types of triggers without departing from the spirit and scope of the invention.

AIN SSPs 114 and 116 may allow normal switch processing to be suspended at specific points in a call so that the switch may send an AIN message query via signaling transfer point (STP) 117 to SCP 118, 119 or 120. SCP 118, 119 or 120 may execute software based service logic and return call-processing instructions to the triggering AIN SSP. New services may be provisioned by assigning AIN SSP triggers to customer lines, trunks, and/or NANP (North American Numbering Plan) telephone numbers.

Much of the intelligence of the AIN resides in a type of AIN element referred to as a service control point (SCP) 118, 119, 120 that is connected to STP 117 over an SS7 data link, or the like, 154, 156 or 158. Among the functions performed by SCP 118, 119, 120 is the hosting of network databases and subscriber databases, which may be stored in respective data storage objects 123, 124, 125. For example, data storage object 123 is shown as a database communicatively coupled to SCP 118, although data storage object 123 may be embodied as a component within SCP 118, such as an internally-mounted hard disk device. The databases stored in data storage object 123 may be used in providing telecommunications services to a customer. Typically, SCP 118, 119, 120 is also the repository of service package applications (SPAs) that are used in the application of telecommunication services, enhanced features, or subscriber services to calling lines. Additionally, SPAs may use databases for providing telecommunication services.

A set of triggers may be defined at the SSPs 114, 116. A trigger in the AIN is an event associated with a particular call that initiates a query to be sent to SCP 118, 119 or 120. The trigger causes selected SCP 118, 119 or 120 to access, if necessary, its respective database 123, 124 or 125 for processing instructions with respect to the particular call. The results of the SCP processing and/or database inquiry is/are sent back to selected SSP 114 or 116 in a response through STP 117. The return packet includes instructions to SSP 114, 116 as to how to process the call. The instructions may be to take some special action as a result of a customized calling service, enhanced feature, or subscriber service. In response, switch 114, 116 moves through its call states, collects the called digits, and generates further packets that are used to set up and route calls. Similar devices for routing calls among various local exchange carriers are provided by regional STP and regional SCP.

An example of such a trigger is a termination attempt trigger (TAT), which causes a query to be sent to SCP 118, 119 or 120 whenever an attempt is made to terminate a call on the line of subscriber 110 or 112. Another type of trigger that may be used is a Public Office Dialing Plan (PODP) trigger but it should be understood that the spirit and scope of the invention encompass the use of other triggers.

The AIN may also include a services circuit node 134 (SCN), which may also be referred to herein as a services node (SN). SN 134 is an interactive data system that acts as a switch to transfer calls. SN 134 may provide interactive help, collect voice information from participants in a call, and/or provide notification functions. SN 134 may be a Lucent Technologies Star Server FT Model 3200 or Model 3300 although other devices may be employed without departing from the scope of the invention. SN 134 may include voice and dual tone multi-frequency (DTMF) signal recognition devices and/or voice synthesis devices. In addition, SN 134 may include a data assembly interface. SN 134 may be connected to local SCP 118, 119, 120 via respective data links 166, 168, 170 using an X.25, SS7 or TCP/IP protocol or any other suitable protocol. In addition, SN 134 typically may be connected to one or more (but usually only a few) SSPs via Integrated Service Digital Network (ISDN) lines or any other kind of suitable telephone lines.

Systems and Methods for Automatic Provisioning Verification

The AIN may include a testing device 180 where testing device 180 operates by placing a call from outgoing telephone line 180a to check if a service has been properly provisioned. If the service is properly provisioned, testing device 180 may receive a return call on telephone line 180b. To verify provisioning using this aspect of the disclosed invention, the return call may include the called number or subscriber-specific data in the calling number field. If no call is received on line 180b within a specified time period, it may be concluded that something in the provisioning process is incorrect or incomplete, and may require further checking. If the return call includes subscriber-specific data, and the included subscriber-specific information fails to agree with information contained at testing device 180, then database 123, 124 or 125 associated respectively with SCP 118, 119 or 120 may not have been properly updated.

As an example, if a subscriber subscribes to a new AfN-based service, such as Call Forwarding, a trigger may need to be set at SSP 114, and STP 117 and SCP 118 may need to be updated. Testing device 180 may place a call to SSP 114 over line 180a. If a necessary trigger is not properly set at SSP 114, the test call will not be routed to STP 117 and SCP 118 and no return call will be received on line 180b within the specified time limit, signifying that the service has not been provisioned properly. Alternately, if the trigger at SSP 114 was properly initiated, but STP 117 was not properly provisioned, a call would not be routed to SCP 118 and a return call would not be received on line 180b within the specified time period, signifying that the service was not properly provisioned. Alternately, if the trigger at SSP 114 was properly set and STP 117 was properly provisioned but the database at SCP 118 was not updated with the new subscriber information, a call would not be received on line 180b within the specified time period, signifying that the service was not properly provisioned. Alternately, if a call is received on line 180b within the specified time period, but the subscriber-specific data received does not agree with the subscriber-specific data contained at database 126 associated with testing device 180, then database 123 of SCP 118 may not have been correctly updated and provisioning may not have been correctly accomplished.

Testing device 180 may include, in a preferred embodiment, a computing device, an outgoing telephone line 180a and an incoming telephone line 180b. Line 180b may have the capacity to receive a calling party number. In accordance with one aspect of the present invention, a calling party number field containing subscriber-specific data may be sent to line 180b for a service if a telephone company wants to verify provisioning of the subscriber-specific data.

An example of a subscriber service for which subscriber-specific data may be maintained at SCP 118, 119 or 120 is AIN-Based Call Forwarding. Information maintained, for example, in database 123 associated with SCP 118 concerning AIN-based Call Forwarding for a particular subscriber may be verified by the disclosed invention.

Testing device 180 may include a processor, memory, and input and output devices. The invention is operational with numerous general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Although in FIG. 1, testing device 180 is communicatively connected to SSP 114, it will be appreciated that testing device 180 could be connected to any SSP without departing from the spirit and scope of the invention. Testing device 180 may be communicatively connected to SSP 114 by a POTS (plain old telephone system) line or by a BRI line or by a PRI line or by any other suitable telephone line. Among the functions performed by testing device 180 is the maintenance of a list of subscribers whose provisioning needs to be verified. The list of subscribers as well as subscriber-specific data may be stored in data storage object 126. Data storage object 126 is shown as a database communicatively coupled to testing device 180, although data storage object 126 may be embodied as a component within testing device 180, such as an internally-mounted hard disk device or stored upon a suitable computer-readable medium. The database stored in data storage object 126 may be used in verifying that telecommunications services to a customer have been correctly provisioned and in the generation of an error list which identifies data such as, for example, the telephone number of customers for whom the provisioned service has been incorrectly provisioned.

Thus, in summary, each telephone set (e.g., subscriber 110, 112) is connected via a telephone line 111 to a telephone system including SSPs 114 and 116, at least one STP 17, at least one SCP 118, 119 or 120 and testing device 180. Testing device 180 contains control logic and subscriber-specific data, and may produce a list identifying telephone directory numbers for which provisioning incorrect or incomplete. SCPs 118, 119 and 120 contain control logic and may contain subscriber-specific data. Each SSP 114 and 116 may be connected to a plurality of subscriber sets 110, 112. Additionally, SCP 118, 119 and/or 120 may provide routing instructions to a plurality of SSPs 114, 116. Connections 150, 152, 154, 156 and 158 between SSP 114, 116, STP 117, and SCP 118, 119 and 120 are preferably SS7 connections although other suitable connections may be employed without departing from the spirit and scope of the invention.

Figure 2:
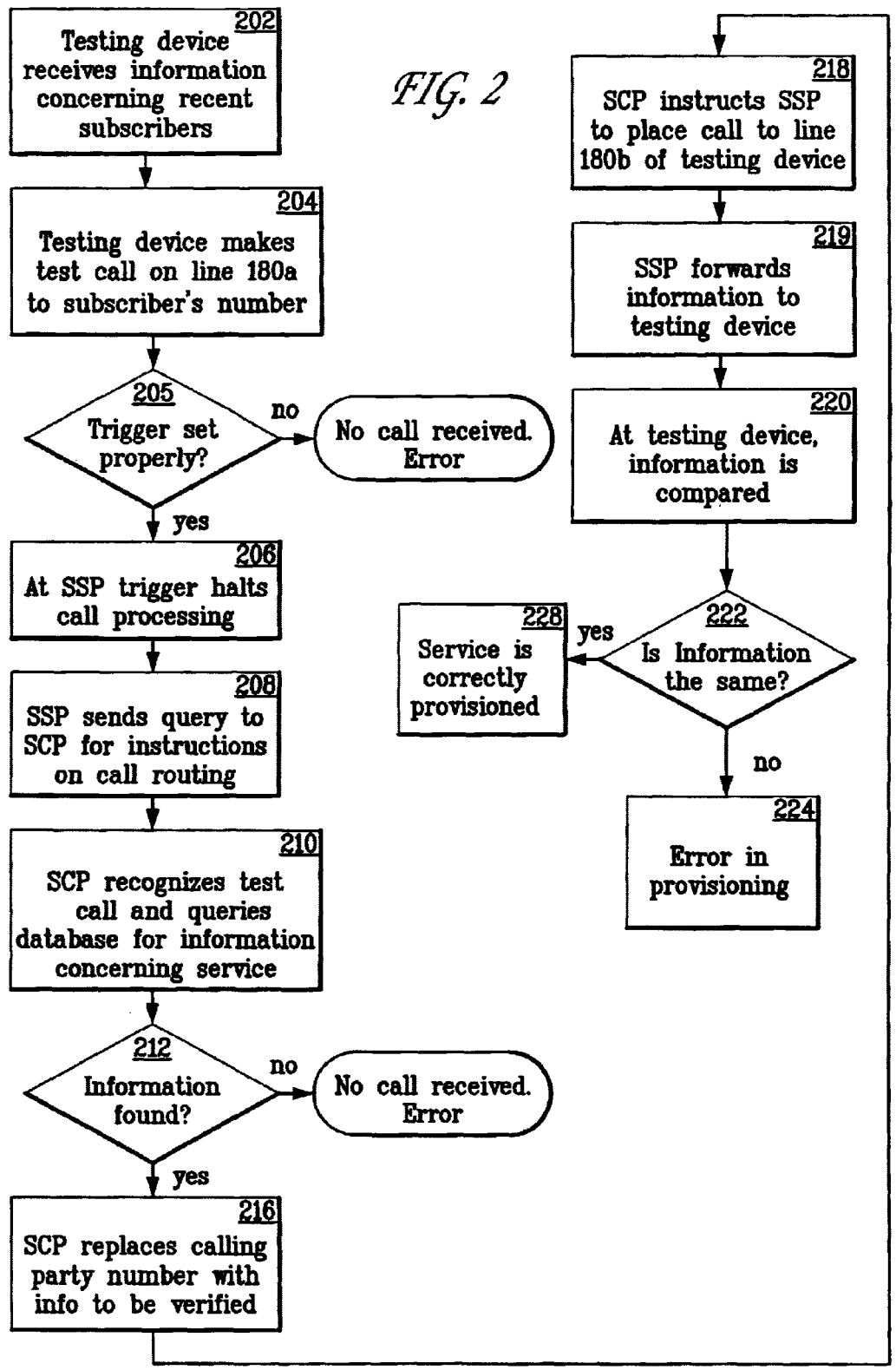
FIG. 2 is a flowchart of a process in accordance with the invention for verifying the proper provisioning of an AIN service.

With reference to FIG. 2, methods are now described for validating that a provisioned service has been correctly provisioned and identifying those cases in which provisioning has not been correctly accomplished. The methods of FIG. 2 may be implemented within the AIN depicted in FIG. 1. However, the methods of FIG. 2 may be used to validate provisioning in any call processing environment, without departing from the spirit and scope of the invention.

According to one aspect of the invention, a method for providing an automatic validation of provisioning within an AIN or AIN-type environment is provided. When a subscriber initiates a request for a new service, multiple network elements must be updated with subscription data. For example, if a customer signs up for AIN-based Call Forwarding, the following network elements may need to be updated: an SSP (provisioned with a trigger), and an STP and an SCP, including any databases associated therewith, may be provisioned with data identifying information concerning the provisioned service. Although the elements listed are exemplary devices, it should be understood that it may be necessary to update fewer or additional elements and that any additional elements are included within the spirit and scope of the disclosed invention.

The automatic provisioning verification system provides an automatic method of checking or validating that the updating (or provisioning) of the aforementioned elements has proceeded correctly. The automatic provisioning validation system may include a testing device including two telephone lines, at least one SSP and at least one SCP. One of the telephone lines of the testing device may be an incoming line and one line may be an outgoing line.

Referring now to FIG. 2, at step 202, testing device 180 receives information by methods such as are well-known in the art, including but not limited to downloading, that identify recent subscribers to services. In a preferred embodiment the information received may include for each subscriber the telephone directory number and if needed, subscriber-specific data that needs to be verified, for the service which has been requested.

For a non-limiting example, the testing device may receive the information that telephone station 110, having directory telephone number (215) 555-9999 has recently subscribed to an AIN-based service such as Call Forwarding and that on Monday, calls to (215) 555-9999 are to be forwarded to (215) 555-8888. In order to implement AIN-based Call Forwarding, it may be necessary to provision several items in the AIN system, specifically to provision a trigger at SSP 114 and to provision at least one database entry at SCP 118. In particular, in the case of Call Forwarding, a subscriber may specify that on Monday, calls for telephone station 110, having directory telephone number (215) 555-9999 should be forwarded to directory telephone number (215) 555-8888. In order for the AIN-based Call Forwarding service to be provisioned correctly, SCP 118 would need to be updated with the aforementioned information.

With respect to the example above, at step 204, on Monday, testing device 180 may make a test call to subscriber station 110 by dialing the directory number of the subscribing party's telephone line, that is, by dialing (215) 555-9999. In accordance with the present invention, testing device 180 using outgoing line 180a having telephone number (215) 555-0001 directs a call to directory number (215) 555-9999. The call may be directed to SSP 114 associated with test line 180a.

At step 205, if a trigger such as, but not limited to a termination attempt trigger (TAT) is not set properly, no call will be received on line 180b and directory number (215) 555-9999 will appear on an error list because no call will be received on incoming line 180b of testing device 180 within a specified time period. If however, the trigger is set properly, at step 206 the call will be suspended and call processing will halt temporarily. It should be understood that although a termination attempt trigger is specifically mentioned, other triggers including but not limited to Public Office Dialing Plan (PODP) triggers may be utilized.

At step 208, SSP 114 sends a message to SCP 118 through STP 117 for instructions as to how to route the call. The message SSP 114 sends to SCP 118 contains calling number field containing "2155550001", the calling line number of line 180a and called number field containing "2155559999". Because the call is a test call made from outgoing line 180a of testing device 180, the calling telephone number sent to SCP 118 will be the telephone number (215) 555-0001 of the outgoing line 180a of testing device 180. SCP 118 contains logic to recognize that a call received from calling line number (215) 555-0001 is a test call.

At step 210, SCP 118 recognizes that the call is a test call, based on the calling number field containing "2155550001" in the message. For the example given, AIN-based Call Forwarding, database 123 must be properly updated with subscriber-specific data that tells SCP 118 where and under what conditions to forward the call. This information may be stored in database 123 at SCP 118. Thus, SCP 118 attempts to retrieve information from its subscribers' database concerning the subscriber's service. In the example, SCP 118 queries database 123 for information concerning telephone directory line (215) 557-9999's Call Forwarding service.

At step 216, SCP 118 replaces the calling number field containing "2155550001" with information to be verified (with respect to the example, the calling number field data is replaced with the number to which a call to (215) 557-9999 should be forwarded to on Monday, that is, the contents of calling number field, is replaced by the contents of subscriber-specific data field of database 123. Hence, with respect to the above example, "2155558888" replaces "2155550001" in calling number field.

At step 218 SCP 118 instructs SSP 114 to complete the call to line 180b of testing device 180 rather than to complete the call to the subscriber.

At step 219, SSP 114 completes the call to line 180b of testing device 180, sending calling number field containing "2155558888" received from SCP 118 to testing device line 180b.

At step 220 testing device 180 compares information received from SSP 114 in the calling number field ("2155558888"), with information contained in testing device 180's subscriber database 126 for the subscriber's telephone line.

If at step 222, the data in subscriber database 126 for called number (215) 557-9999 agrees with data received from SSP 114, at step 228, the service is said to be properly provisioned.

If, however, the data does not agree, at step 224, the telephone number of the subscriber is identified on a list designating service subscriptions which require further investigation, that is, provisioning is not correct.

As previously mentioned in connection with steps 205 and 212, if no return call is received corresponding to a test call within a specified time period, it is concluded that the service has not been provisioned correctly and requires further investigation. The directory telephone number of the subscriber for whom no call was received on line 180b is identified on an error list.

The error list may be printed, displayed or stored on a computer-readable medium in any manner, in accordance with methods well-known in the art, and may include additional data as desired without departing from the spirit and scope of the invention.

Figure 3:
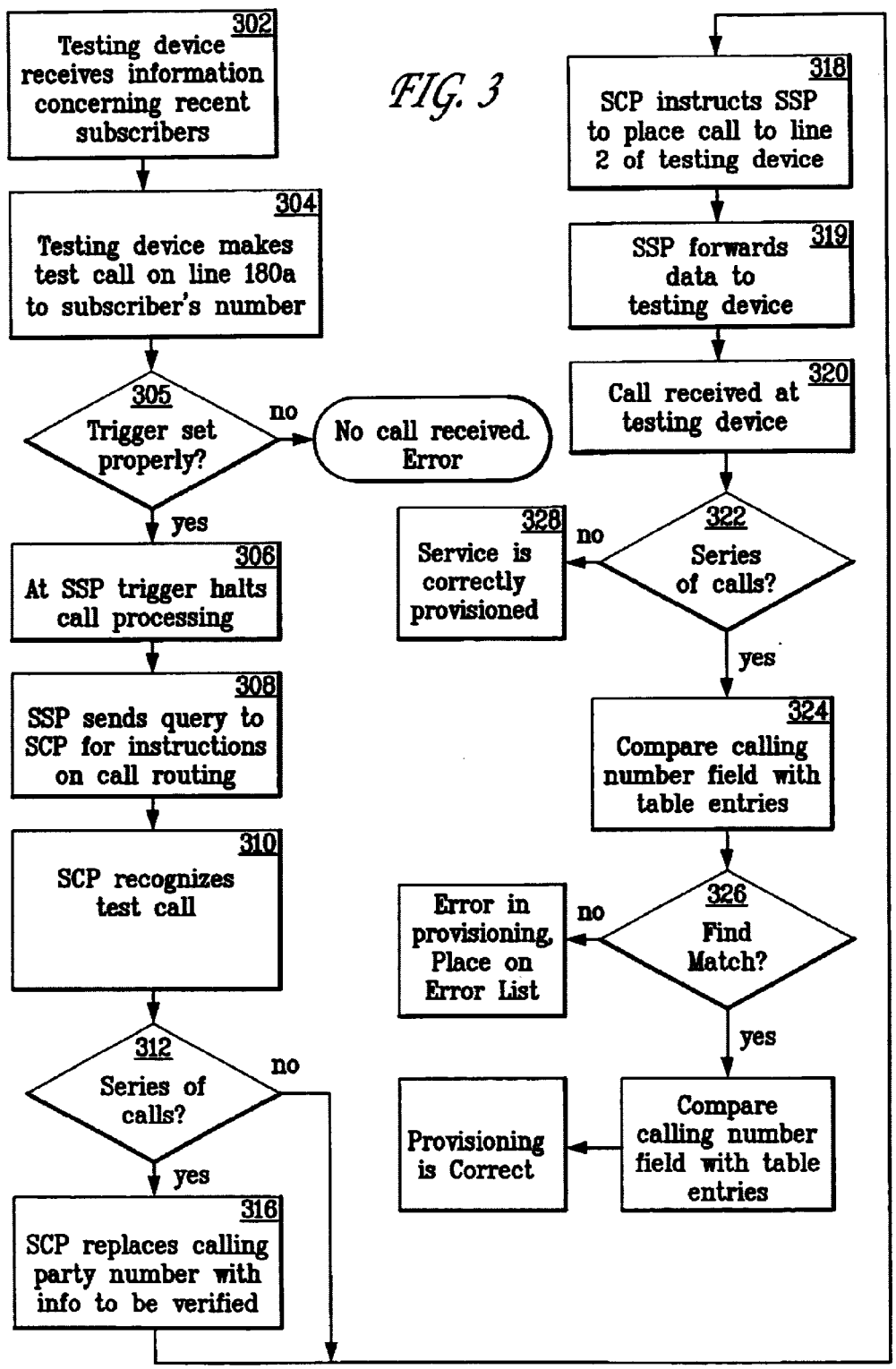
FIG. 3 is a flowchart of a process in accordance with another aspect of the invention.

In accordance with another aspect of the invention, and referring now to FIG. 3, it should be understood that for a service for which no data is required to be stored at SCP 118, such as, for example, for Call Blocking service, the same process is followed except that there will be no data retrieval function at step 310 and calling number field may not be replaced at step 316. In addition, if provisioning for a series of telephone numbers will be tested, a table of telephone numbers may be stored at testing device 180.

If a testing mode in which one test call at a time is placed (described below), calling line number field (containing the directory number of outgoing line 180a of testing device 180) will not be replaced by called line number at step 316 and the mere fact that a call is received at 180b at step 320, verifies that provisioning has been accomplished correctly. If a series of test calls are placed by testing device 180, calling line number field may be replaced at step 316 by called number.

Some services, such as but not limited to, Calling Name Service, which provides the name of the calling party on a display to a called party, or Call Blocking Service, which prevents calls to certain numbers, do not require SCP 118 database 123 to be updated with subscriber-specific data, but merely require one or more triggers to be set. In accordance with this aspect of the invention, and referring now to FIG. 3, if, for example, a subscriber having telephone directory number (215) 555-9999 subscribes to a service such as, but not limited to, Call Blocking, and a telephone company wishes to test provisioning for this service, testing device 180 will receive data indicating that provisioning for Call Blocking for the subscriber having telephone number (215) 555-9999 needs to be tested.

At step 302 of FIG. 3, testing device 180 receives information by methods such as are well-known in the art, including but not limited to downloading, that identify recent subscribers to services. In a preferred embodiment the information received may include for each subscriber the telephone directory number for the service which has been requested. As a non-limiting example, the testing device may receive the information that telephone station 110, having directory telephone number (215) 555-9999 has recently subscribed to an AIN-based service, such as but not limited to, Call Blocking. In order to implement Call Blocking, it is necessary to provision several elements in the AIN system, specifically to provision a trigger at SSP 114. It should be understood that the spirit and scope of the invention would include the need to provision other elements in addition to SSP 114, if necessary.

With respect to the example above, at step 304, testing device 180 may make a test call to subscriber station 110 by dialing the directory number of the subscribing party's telephone line, that is, by dialing (215) 555-9999. In accordance with the present invention, testing device 180 using outgoing line 180a having telephone number (215) 555-0001 directs a call to directory number (215) 555-9999. The call is directed to SSP 114 associated with test line 180a.

At step 305, if a trigger such as a termination attempt trigger (TAT) is not set properly no call will be received on line 180b and directory number (215) 555-9999 will appear on an error list because no call will be received on incoming line 180b of testing device 180 within a specified time period. If, however, the trigger is set properly, at step 306, the call will be suspended and call processing will halt temporarily. It should be understood that although a termination attempt trigger is specifically mentioned, other triggers including but not limited to Public Office Dialing Plan (PODP) triggers may be utilized.

At step 308, SSP 114 sends a message to SCP 118 through STP 117 for instructions as to how to route the call. The message SSP 114 sends to SCP 118 may contain calling number field containing "2155550001", the calling line number of line 180a and called number field containing "2155559999", if a series of test calls are being made.

At step 310 SCP recognizes the call as a test call because calling line number field contains a number ("2155550001") that SCP recognizes as a test calling number.

If a series of calls are being made, at step 316, SCP 118 may replace calling number field containing "2155550001" with called number "2155559999".

If only one test call is being placed at a time, calling number field containing "2155550001" is not replaced by called number "2155559999". If only one test call is being placed at a time and a call is received on incoming line 180b within the specified time period, it may be concluded that provisioning has been correctly accomplished for the subscriber and service tested. If, however, no call is received on line 180b within the specified time period, then it may be concluded that provisioning has not been correctly accomplished and telephone number (215) 555-9999 will appear on an error list.

In a second mode, testing device 180 places a series of calls at step 304. For example testing device 180 may place a call to (215) 555-9999, to (215) 555-9998 and to (215) 555-9997 simultaneously, using multiple lines. Because in a network environment, it is not possible to predict which return call will arrive at incoming line 180b first, a table is maintained on testing device 180 containing the called line number for each test call made. In accordance with this aspect of the invention, as previously discussed, at step 316, SCP replaces calling party number "2155550001" with called party number "2155559999" for the first test call, "2155559998" for the second call or "2155559997" for the third call.

At step 318, SCP 119 instructs SSP 114 to complete the call to line 180b of testing device 180 rather than to complete the call to subscriber 110.

At step 319, SSP 114 completes the call to line 180b of testing device 180. When a return call for (215) 555-9999 is received at step 319 the called number "2155559999" stored in the calling number field is retrieved and compared with the table entries. If a match is found, provisioning is correct for telephone number (215) 555-9999. After a specified time period, any entries in the test call table for which no return call was received appear on an error list, listing telephone numbers for which provisioning is not correct. As an example, if no return call is received for telephone number (215) 555-9998 within a specified time period, (215) 555-9998 would appear on an error list.

At step 320, if one test call is being placed at a time, testing device 180 waits to see if a return call is received on line 180b before placing another test call. In accordance with this aspect of the invention, for subscriber services which do not require database 123 at SCP 118 to be updated with subscriber-specific information, SCP will not replace calling party number (2155550001) with called party number (2155559999). Receiving a return call on line 180b within a specified time limit verifies that the service subscribed to has been successfully provisioned. If no return call is received within a specified time period, the called number is placed on an error list.

For subscriber services which require SCP 118 to be updated with subscriber-specific information, SCP 118 may replace calling party number field with subscriber-specific data contained at SCP 118, when one test call is placed at a time. Content of calling party number is compared with subscriber-specific data at testing device 180 as previously described with reference to FIG. 2. Telephone numbers for those subscribers for whom subscriber-specific data in calling number field does not match subscriber-specific data at testing device 180 appear on a error list.

According to another aspect of the invention, testing device 180 can be operated in a manual mode requiring human intervention. In accordance with this aspect of the invention, an operator places a call to subscriber's line 110 having directory number (215) 555-9999 from test line (215) 555-0001. Steps 305 to 316 are performed as previously, but at step 318, SCP 118 does not instruct SSP 114 to place a call to line 180b. Instead SCP, may instruct SSP 114 to send the call to SN 134. SN 134 retrieves and translates to speech the contents of calling party number field, containing, for example, called number "2155559999" and announces to a human operator, a message such as, but not limited to, "A test call has been received for (215) 555-9999." In this way an operator knows that the service for (215) 555-9999 has been properly provisioned. Conversely, failure to receive such an announcement within a specified time period, indicates that provisioning has not been properly accomplished. Well-known text to speech or recorded sound files are utilized in conversion of text to speech at SN 134.

Thus systems and methods for automatic provisioning validation are disclosed. It should be understood that the "call" in the example of FIG. 2 encompasses any situation in which a testing device party uses a telephone directory number to verify that a service has been correctly provisioned. For example, the calling party may be calling a server machine on the network in order to check that a service offered by the provider of the telephone network has been properly provisioned. An example of such a service is voice mail, where the subscriber of the voice mail service dials a number to reach the voice mail server in order to retrieve messages or record a greeting. Such communications are considered "calls" in the example of FIG. 2, notwithstanding the fact that the call is not being placed from one customer on the network to another customer.

It is noted that the written description provided herein contains acronyms which refer to various communication services and system components. Although known, use of several of these acronyms is not strictly standardized in the art. For purposes of the written description herein, acronyms will be defined as follows:

10D—10 Digit Trigger
AIN—Advanced Intelligent Network
CCIS—Common Channel Interoffice Signaling
CCS—Common Channel Signaling
CDP—Customized Dialing Plan
CO—Central Office
CPR—Call Processing Record
CPN—Calling Party Number
DLN—Dialed Line Number
DRS—Data and Reports System
EO—End Office
ISCP—Integrated Service Control Point
ISUP—ISDN Users Part
LATA—Local Access and Transport Area
MF—Multi-Frequency
NANP—North American Numbering Plan
NPA—Numbering Plan Area
NXX—Central Office Code
PODP—Public Office Dialing Plan
PRI—Primary Rate Interface
PSTN—Public Switched Telephone Network
SCE—Service Creation Environment
SCP—Service Control Point
SMS—Service Management System
SS7—Signaling System 7
SSP—Service Switching Point
STP—Signaling Transfer Point
TAT—Termination Attempt Trigger
TCAP—Transaction Capabilities Applications Part
TG—Trunk Group
TN—Telephone Number It is noted that the foregoing examples have been provided merely for the purpose of explanation and are in no way to be construed as limiting of the present invention. While the invention has been described with reference to preferred embodiments, it is understood that the words which have been used herein are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects. Additionally, certain features and functions attributed to a particular network element may be performed by another network element without departing from the scope and spirit of the invention. As an example, if a function such as a database query is attributed to a network element such as an SSP, such query may be performed alternatively or additionally by an STP or SCP or by any other network element without departing from the spirit and scope of the invention.

What is claimed is:

1. In an advanced intelligent network comprising a testing device containing a database and having a first telephone line and a second telephone line, the testing device connected to a service switching point, and a service control point connected to the service switching point, the service control point containing a database, a method for verifying that a subscriber service has been properly provisioned, comprising:

at the testing device, placing a test call on the first telephone line to a telephone number having a known provisioned service attached thereto;

at the service control point, identifying the receipt of the test call;

at the service control point, retrieving information associated with the provisioned service for said telephone number;

at the service control point, sending retrieved information associated with the provisioned service for said telephone number to the service switching point;

at the service switching point, receiving information associated with the provisioned service for said telephone number from the service control point;

at the service switching point, sending received information associated with the provisioned service for said telephone number from the service control point to the testing device;

at the testing device, comparing the received information associated with the provisioned service for said telephone number from the service control point with information contained on the testing device database; and at the testing device, identifying that the provisioned service has been properly provisioned.

2. The method of claim 1, further comprising at the testing device, if a response is not received on the second phone line, identifying that the service has not been properly provisioned.

3. The method of claim 2, wherein identifying that the provisioned service has not been properly provisioned comprises writing the number having the incorrectly provisioned service to an error list.

4. A computer-readable medium containing computer-readable instructions for performing the method as recited in claim 1.

5. The method of claim 1, further comprising at the testing device, if the information associated with the provisioned service for said telephone number received from the service control point is not substantially identical to information associated with the provisioned service contained on the testing device database, writing said information received from the service control point and said information contained on the testing device to a error list.

6. The method of claim 1, wherein identifying the receipt of a test call at the service control point comprises checking if the call is made from the first line of the testing device.

7. The method of claim 5, wherein writing said information received from the service control point and said information contained on the testing device to an error list comprises writing a telephone directory number for which a service is not provisioned correctly to an error list.

8. The method of claim 1, further comprising identifying that a service has not been properly provisioned where a call is not received on the second telephone line within a known period of time.

9. A system for verifying the provisioning of a subscriber telephone service comprising:

a testing device containing a database, a first telephone line, and a second telephone line, said testing device is adapted to place a call over said first telephone line to a telephone station having a subscriber telephone service associated therewith;

a service switching point in communication with said testing device; and a service control point containing a database and in communication with the service switching point;

wherein said service switching point is adapted to receive a call from the first line of the testing device and forward a request for information to said service control point, said service control point is adapted to identify that a test call has been placed from the first telephone line of the testing device, verify that the service control point database contains information specifying that the telephone station has the subscriber service associated therewith, and forward information to the second line of the testing device verifying that the subscriber service has been properly provisioned, and said testing device is adapted-upon receipt of a call on said second telephone line, to identify that the subscriber telephone service has been properly provisioned.

10. The system of claim 9, wherein said testing device is further adapted to identify the subscriber service as not having been properly provisioned if a call is not received over said second telephone line.

11. The system of claim 9, wherein said testing device is further adapted to compare information in the testing device database with information received on said second telephone line and if the information in the testing device database is not substantially the same as the information received on said second telephone line, identify that the subscriber telephone service has not been properly provisioned.

* * * * *